L. K. LARRISON.
DISPENSING APPARATUS.
APPLICATION FILED JUNE 14, 1910.

1,005,650.

Patented Oct. 10, 1911.

WITNESSES
George Bambay.
H. Whiting.

INVENTOR
Lewis K. Larrison
BY Munn & Co.
ATTORNEYS

UNITED STATES PATENT OFFICE

LEWIS K. LARRISON, OF WHARTON, NEW JERSEY.

DISPENSING APPARATUS.

1,005,650. Specification of Letters Patent. Patented Oct. 10, 1911.

Application filed June 14, 1910. Serial No. 566,780.

*To all whom it may concern:*

Be it known that I, LEWIS K. LARRISON, a citizen of the United States, and a resident of Wharton, in the county of Morris and State of New Jersey, have invented a new and Improved Dispensing Apparatus, of which the following is a full, clear, and exact description.

This invention relates to a new and improved device whereby a predetermined amount of liquid can be dispensed from a bottle or other suitable receptacle.

An object of this invention is to provide a device which will be simple in construction, inexpensive to manufacture, easily adjusted and operated, and with the fewest parts consistent with a quick and positive action.

A further object of this invention is to provide a receptacle with an internal receptacle or conduit adapted to receive any predetermined amount of liquid from the first-mentioned receptacle, to remove the same from said receptacle.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1:
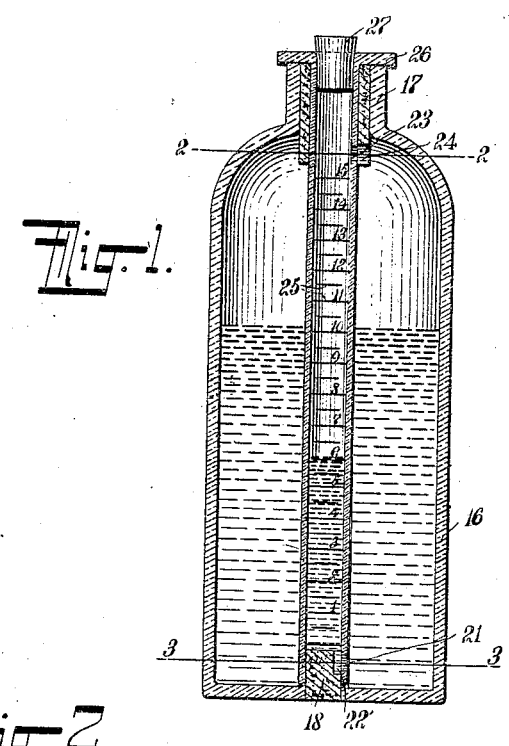
Figure 2:
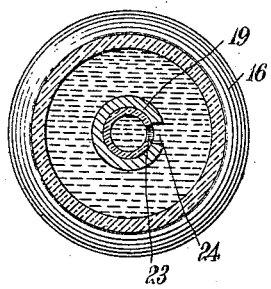
Figure 3:
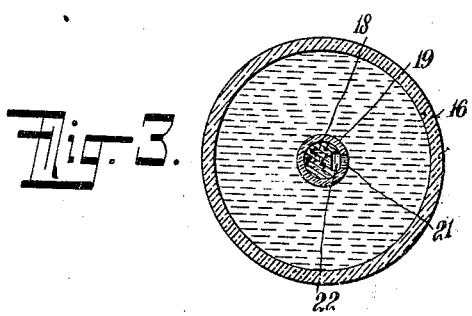

Figure 1 is a vertical section through the center of my device, Fig. 2 is a horizontal section on the line 2—2 of Fig. 1; and Fig. 3 is a horizontal section on the line 3—3 of Fig. 1.

Referring more particularly to the separate parts of the device, 16 indicates a receptacle of any suitable sort, such as a glass bottle, which is provided with a neck 17. Connected to the bottom of the receptacle 16 there is provided a member 18, which is shown in the form of a cork extending through an opening in the bottom of the bottle 16. Rotatably and slidably mounted on this member 18, so that it can be readily moved relative thereto and disengaged therefrom, there is provided a conduit or receptacle 19, in the form of a tube, preferably made of some transparent material, such as glass. This receptacle extends upwardly through the neck 17 and has threaded thereon a sleeve 20, which is preferably made of some resilient material, such as cork, and extends between the tube 19 and the neck 17 of the bottle 16. The tube 19 is provided adjacent its lower end with an opening 21, which is adapted to be brought into and out of coöperation by the rotation of the tube 19, with a groove 22 in the member 18. By this means, communication is obtained between the interior of the receptacle 16 and the interior of the tube 19.

In order that air may be let into the upper portion of the receptacle 16, so that when the communication is completed between the interior of the receptacles 16 and 19 the fluid in the receptacle 16 may flow into the receptacle 19, there is provided adjacent the upper portion of the receptacle 19, an opening 23, which is adapted to be adjusted into and out of co-action with a groove or opening 24 in the sleeve 20. The tube 19 is provided with a flange 26 which forms a finish and whereby it can be readily rotated.

The receptacle or tube 19 is provided with graduations 25, inscribed thereon in any suitable manner, for indicating the amount of fluid in the tube or receptacle 19, and has also provided for this purpose, suitable numerals or other signs for designating the exact measure from the bottom of the tube 19 to any particular graduation mark.

The operation of the device will be readily understood when taken in connection with the above description. The bottle, containing a medicine or other liquid, may be sold with the central tube or receptacle, or the central tube may be added to a separate bottle. When it is desired to dispense a certain quantity of the liquid in the main bottle or receptacle, the tube or receptacle 19 is rotated so as to bring the openings 21 and 23 into alinement with the grooves or openings 22 and 24, so that communication is simultaneously opened at a plurality of points between the interior of the receptacle 16 and the receptacle 19, thereby permitting the liquid to flow into the receptacle 19 at the bottom, and simultaneously permitting the air to flow into the top of the receptacle 16. When the liquid has reached the desired height in the graduated tube 19, as indicated by the graduation marks thereon, the tube 19 is rotated so as to bring the openings 21 and 23 out of co-action with the grooves or openings 22 and 24, thereby simultaneously cutting off the communication between the interior of the tube 19 and the receptacle 16. When this takes place, the liquid will cease to flow into the interior of the tube 19, and the bottle can be inverted, pouring the liquid out of the tube 19 into any suitable receptacle, or even, as in the case of a medicine, taking it directly from the tube 19.

This device may be also used to separate the cream from milk by allowing the milk to stand for a while in the receptacle 16, and drawing off the heavier impoverished milk from under the cream, in the manner previously described.

It is understood that a suitable stopper or cork 27 may be provided for the tube 19, in case it should be desired to retain the liquid within said tube.

While I have shown one embodiment of my invention, I do not wish to be limited to the specific combination thereof, but desire to be protected in various changes, modifications and alterations which may come within the scope of the appended claims.

Having thus described my invention, I claim as new and desire to secure by Letters Patent:—

1. In a device of the class described, the combination with a receptacle, of a member in said receptacle and having an opening therein, a receptacle rotatably connected to said member and having an opening therein adapted to coöperate with said opening in said member, and a sleeve connected to said second-mentioned receptacle and having an opening therein said second-mentioned receptacle having an opening therein adapted to coöperate with said opening in said sleeve.

2. In a device of the class described, the combination with a transparent receptacle, of a member connected to said receptacle, and having an opening therein, a transparent receptacle adjustably connected to said member and having an opening adapted to coöperate with said first-mentioned opening, said second-mentioned receptacle having graduations thereon, and a sleeve interposed between said receptacles and having an opening therein, said second-mentioned receptacle having an opening therein adapted to coöperate with said opening in said sleeve.

3. In a device of the class described, the combination with a receptacle, of a measuring receptacle within said first-mentioned receptacle and having vertically-spaced openings therein, and members vertically spaced from each other adapted to close said openings and having openings adapted to be brought into registration with said first-mentioned openings to open communication between said receptacles.

In testimony whereof I have signed my name to this specification in the presence of two subscribing witnesses.

LEWIS K. LARRISON.

Witnesses:
HARRY L. SCHWARZ,
MARY E. MAUGER.